US010951710B2

(12) United States Patent
Chiu et al.

(10) Patent No.: US 10,951,710 B2
(45) Date of Patent: *Mar. 16, 2021

(54) CACHE MIGRATION MANAGEMENT IN A VIRTUALIZED DISTRIBUTED COMPUTING SYSTEM

(71) Applicant: International Business Machines Corporation, Armonk, NY (US)

(72) Inventors: Lawrence Y. Chiu, Saratoga, CA (US); Hyojun Kim, San Jose, CA (US); Paul H. Muench, San Jose, CA (US); Sangeetha Seshadri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,007

(22) Filed: Sep. 17, 2019

(65) Prior Publication Data

US 2020/0014755 A1 Jan. 9, 2020

Related U.S. Application Data

(63) Continuation of application No. 15/843,155, filed on Dec. 15, 2017, now Pat. No. 10,601,919, which is a
(Continued)

(51) Int. Cl.
*H04L 29/08* (2006.01)

(52) U.S. Cl.
CPC ...... *H04L 67/1097* (2013.01); *H04L 67/2842* (2013.01)

(58) Field of Classification Search
CPC .............. H04L 67/1097; H04L 67/2842
See application file for complete search history.

(56) References Cited

U.S. PATENT DOCUMENTS

| 7,437,509 B2 | 10/2008 | Vayssiere |
| 7,640,356 B2 | 12/2009 | Ananthakrishnan et al. |

(Continued)

OTHER PUBLICATIONS

Notice of Allowance dated Nov. 7, 2019, pp. 11, for U.S. Appl. No. 15/843,155, (18.504C1).

(Continued)

*Primary Examiner* — Joe Chacko
(74) *Attorney, Agent, or Firm* — Konrad Raynes Davda & Victor LLP

(57) ABSTRACT

In accordance with one aspect of the present description, in response to a detection by a storage controller, of an operation by a host relating to migration of input/output operations from one host to another, a cache server of a storage controller, transmits to a target cache client of the target host, a cache map of the source cache of the source host wherein the cache map identifies locations of a portion of the storage cached in the source cache. In response, the cache client of the target host, may populate the target cache of the target host with data from the locations of the portion of the storage, as identified by the cache map transmitted by the cache server, which may reduce cache warming time. Other features or advantages may be realized in addition to or instead of those described herein, depending upon the particular application.

21 Claims, 6 Drawing Sheets

Related U.S. Application Data continuation of application No. 13/958,363, filed on Aug. 2, 2013, now Pat. No. 9,882,984.

(56) References Cited

U.S. PATENT DOCUMENTS

| | | | |
|---|---|---|---|
| 8,261,026 | B2 | 9/2012 | Klems et al. |
| 8,424,001 | B2 | 4/2013 | Burckart et al. |
| 9,152,599 | B2 | 10/2015 | Blinick et al. |
| 9,549,037 | B2 | 1/2017 | Krueger et al. |
| 9,882,984 | B2 | 1/2018 | Chiu et al. |
| 10,082,972 | B2 | 9/2018 | Gu et al. |
| 10,390,114 | B2 | 8/2019 | Schmisseur |
| 2006/0235977 | A1 | 10/2006 | Wunderlich et al. |
| 2006/0259728 | A1 | 11/2006 | Chandrasekaran et al. |
| 2006/0259734 | A1 | 11/2006 | Sheu et al. |
| 2011/0225117 | A1 | 9/2011 | Nakanishi et al. |
| 2012/0047287 | A1 | 2/2012 | Chiu et al. |
| 2012/0047331 | A1 | 2/2012 | Meza et al. |
| 2012/0131309 | A1 | 5/2012 | Johnson et al. |
| 2012/0137098 | A1* | 5/2012 | Wang ............... G06F 3/0647 711/165 |
| 2012/0215970 | A1 | 8/2012 | Shats |
| 2012/0226866 | A1 | 9/2012 | Bozek et al. |
| 2013/0297894 | A1 | 11/2013 | Cohen et al. |
| 2014/0068197 | A1* | 3/2014 | Joshi ............... G06F 3/0659 711/135 |
| 2015/0193250 | A1 | 7/2015 | Ito et al. |
| 2015/0254018 | A1 | 9/2015 | Lam et al. |
| 2018/0115605 | A1 | 4/2018 | Chiu et al. |

OTHER PUBLICATIONS

S. Marraccini et al., "The Storage Strategy for the Next Decade", EMC Flash Portfolio, Business Development Technology Evangelist, pp. 1-42, 2012.

Office Action dated Oct. 7, 2015, pp. 20, for U.S. Appl. No. 13/958,363, filed Jun. 2, 2013, (18.504).

Response dated Jan. 7, 2016, pp. 11, to Office Action dated Oct. 7, 2015, pp. 20, for U.S. Appl. No. 13/958,363, filed Jun. 2, 2013, (18.504).

Final Office Action dated Apr. 26, 2016, pp. 17, for U.S. Appl. No. 13/958,363, filed Jun. 2, 2013, (18.504).

Response dated Jul. 26, 2016, pp. 13, to Office Action dated Oct. 7, 2015, pp. 20, for U.S. Appl. No. 13/958,363, filed Jun. 2, 2013, (18.504).

Office Action dated Sep. 23, 2016, pp. 21, for U.S. Appl. No. 13/958,363, filed Jun. 2, 2013, (18.504).

Response dated Dec. 23, 2016, pp. 12, to Office Action dated Sep. 23, 2016, pp. 21, for U.S. Appl. No. 13/958,363, filed Jun. 2, 2013, (18.504).

Final Office Action dated Apr. 17, 2017 pp. 23, for U.S. Appl. No. 13/958,363, filed Jun. 2, 2013, (18.504).

Response dated Jul. 17, 2017, pp. 14, to Final Office Action dated Apr. 17, 2017 pp. 23, for U.S. Appl. No. 13/958,363, filed Jun. 2, 2013, (18.504).

Response dated Aug. 17, 2017, pp. 14, for U.S. Appl. No. 13/958,363, filed Jun. 2, 2013, (18.504).

Notice of Allowance dated Sep. 20, 2017, pp. 8, for U.S. Appl. No. 13/958,363, filed Jun. 2, 2013, (18.504).

Office Action dated Sep. 26, 2018, pp. 28, for U.S. Appl. No. 15/843,155, (18.504C1).

Response dated Dec. 26, 2018, pp. 13, to Office Action dated Sep. 26, 2018, pp. 28, for U.S. Appl. No. 15/843,155, (18.504C1).

Final Office Action dated Apr. 25, 2019, pp. 21, for U.S. Appl. No. 15/843,155, (18.504C1).

Response to Final Office Action for U.S. Appl. No. 15/843,155, dated Jun. 25, 2019, 15 pp. [18.504C1 (RFOA1)].

Notice of Allowance for U.S. Appl. No. 15/843,155, dated Jul. 25, 2019, 20 pp. [18.504C1 (NOA1)].

List of IBM Patents or Patent Applications Treated as Related, dated Sep. 17, 2019, 2 pp. [18.504C2 (Appendix P)].

\* cited by examiner

CACHE MIGRATION MANAGEMENT IN A VIRTUALIZED DISTRIBUTED COMPUTING SYSTEM

TECHNICAL FIELD

This description relates in general to virtualized distributed computing systems, and more particularly, to a method, system and computer program product for facilitating cache migration in a virtualized distributed computing system.

BACKGROUND

In order to provide for high-throughput of work, or nearly continuous availability, distributed computing systems are often utilized. A distributed computing system typically includes two or more computing devices which frequently operate somewhat autonomously and communicate with each other over a network or other communication path.

One example of a distributed computing system is a host conducting input/output (I/O) operations in a storage area network (SAN) which includes a storage controller. A storage area network is frequently used to couple computer storage devices such as disk arrays, tape libraries, optical jukeboxes or other storage devices, to hosts in a manner which permits the storage devices to appear to the operating systems of the hosts as locally attached to the hosts. In operation, a host may request data from a storage controller which may in turn retrieve the data from one or more storage devices. The host may also transmit data to the storage controller to be written to one or more storage devices.

Each host communicates with the storage controller through a channel or communication path of the storage area network. Each communication path typically includes one or more physical hardware communication channels such as a digital electronic communication bus, a digital optical communication bus, or a similar communication channel. In addition, each communication path may include one or more logical control blocks, addresses, communication devices, digital switches, and the like for coordinating the transmission of digital messages between the host and the storage controller. Fibre Channel (FC) is often used in storage area networks and is a high speed networking technology in which signals may be transmitted over various transmission media including fiber optic cable or twisted pair copper cables, for example.

A host may have one or more application servers running applications which assign input/output (I/O) tasks to the storage controller. The servers are typically interconnected as nodes of one or more clusters in a distributed computing system, in which each node includes a server often referred to as a central electronics complex (CEC) server.

The I/O tasks may be directed to specific volumes in the storage. The storage controller may further have multiple input/output (I/O) adapters such as host adapters which enable the servers to communicate with the hosts, and device adapters which enable the servers of the storage controller to communicate with the storage devices. Switches may be used to couple selected servers to selected I/O adapters of the storage controller.

Each server may have one or more central processing units (CPUs) in which the processing as well as the memory and other resources of the server may be apportioned into physical or logical partitions (often referred to as a "virtual server" or "virtual machine"), each of which is capable of running an individual copy of an operating system and performing the service functions of a "server". Examples of various virtual machine infrastructures include those marketed under the terms "vmware," "Xen," "KVM," "Hyper-V," and others. To expedite I/O operations, data which is expected to be read in future read I/O operations may be cached in a cache maintained by an application server. Such application-server side caches typically employ flash or other types of relatively fast memory. In addition, because the cache is typically located within or close to the application server, communication delays which may be experienced in communicating with the networked storage controller and its storage, may be reduced. As a consequence, data may frequently be read more quickly from the application-server side cache than from the networked storage controller.

The contents of the application-server side cache is typically managed by cache management software which keeps track of which locations of the storage of the storage controller have been cached for one or more servers or virtual servers. Examples of application-server side cache management hardware and software include VFCache by EMC, FlashAccel by NetApp, IOTurbine by FusionIO, FlashSoft by SanDisk, etc.

Virtual servers may be migrated from one host, the "source host" to another host, the "target host." Such live migration may take place to more evenly balance the loads on the hosts, to consolidate workloads, allow for system maintenance and other reasons. Each virtual machine infrastructure typically has an associated virtual machine migration infrastructure to accomplish the migration of a virtual machine or virtual server from one host to another. Thus, the virtual machine infrastructure marketed as "vmware" has an associated virtual machine migration infrastructure marketed as "vMotion," for example. To accomplish the migration of a virtual machine or virtual server from one host to another, cooperation of multiple components of the hosts is usually involved. Thus, the virtual machine migration infrastructure typically maintains the virtual machine migration related information such as the identity of the source and target hosts, and when a virtual machine migration starts and finishes, for example.

In the event that the virtual machine being migrated has an application-server side cache, that cache is typically extinguished at the source host and recreated at the target host by the virtual machine migration infrastructure. Once created at the target host, the application-server side cache is often repopulated in the typical fashion by the cache management software of the target host. For example, each time the migrated virtual machine issues a read I/O operation, and the read data is not located in the application-server side cache assigned that migrated virtual machine (that is a "miss"), the data is read from the storage of the storage controller and cached for future read operations in the application-server side cache in anticipation of future reads. Such cache repopulation is often referred to as "warming" or "rewarming" the cache and is typically very time consuming. Hence, I/O operations of the migrated virtual machine can be adversely affected by the migration until the application-server side cache for that virtual machine has been fully rewarmed.

SUMMARY

Provided are a method, system and computer program product in which a source host having a source cache and a source cache client, transmits input/output (I/O) requests over a first path to a storage controller controlling a storage wherein the source cache client is adapted to populate the source cache with data entries of data read from locations within a portion of the storage accessed by the I/O requests, a storage controller detects an operation by a host relating to migration of I/O operations from the source host, and a cache server of the storage controller, transmits to a target cache client of a target host, a cache map of the source cache of the source host. In one embodiment the cache map identifies locations of the portion of the storage cached in the source cache. In response to receipt of the cache map, the cache client of the target host, populates the target cache of the target host with data from the locations of the portion of the storage, as identified by the cache map transmitted by the cache server. Other features and aspects may be realized, depending upon the particular application.

BRIEF DESCRIPTION OF THE DRAWINGS

FIG. 5 depicts another example of operations for cache migration management in accordance with another aspect of the present description.

DETAILED DESCRIPTION

Figure 1:
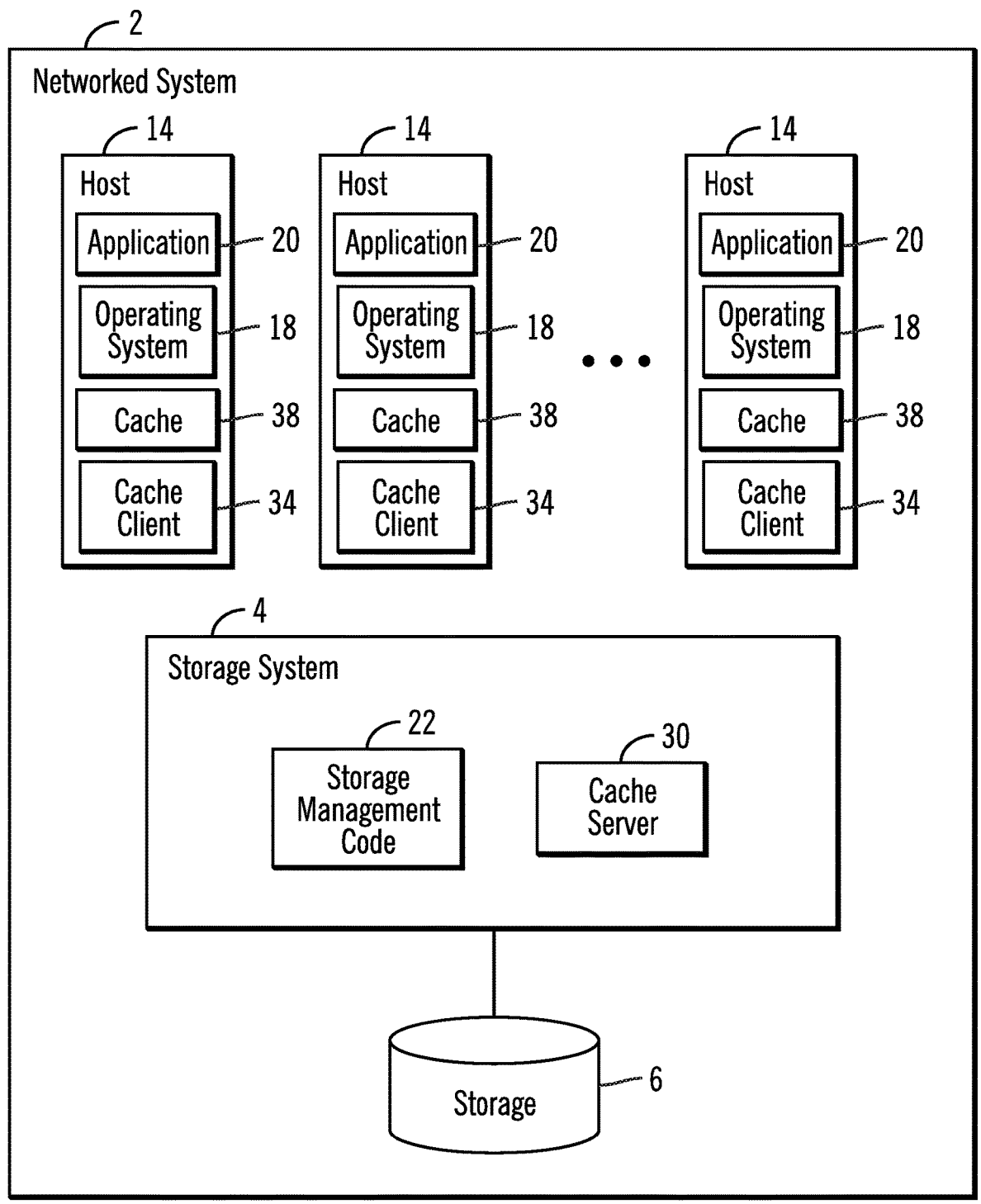
FIG. 1 illustrates an example of a computing environment which may employ cache migration management in accordance with one aspect of the present description.

FIG. 1 illustrates an embodiment of a network computing environment employing cache migration management in accordance with an aspect of the present description. As explained in greater detail below, it is believed that cache management in accordance with one aspect of the present description, can reduce cache warming or rewarming time in connection with the migration of a virtual server from a source host to a target host. In one embodiment, in response to a detection by a storage controller, of an operation by a host relating to migration of I/O operations, a cache server of a storage controller, transmits to a target cache client of the target host, a cache map of the source cache of the source host wherein the cache map identifies locations of a portion of the storage cached in the source cache. In response, the cache client of the target host, may populate the target cache of the target host with data from the locations of the portion of the storage, as identified by the cache map transmitted by the cache server. It is believed that populating of the target cache using the cache map from the cache server of the storage controller can significantly reduce cache warming or rewarming time, depending upon the particular application. It is appreciated that other features or advantages may be realized in addition to or instead of those described herein, depending upon the particular application.

In another aspect of the present description, such populating of the target cache using the cache map provided by the cache server of the storage controller, may occur prior to initiation of, during, or in anticipation of, the migration of a virtual server. Thus, in one embodiment, the cache server may detect that a migration of I/O operations from a source host to a target host has occurred and in response, transmit a cache map to the target cache of the target host in response to such detection. For example, migration of a virtual server may be detected by the storage controller detecting reception of I/O requests accessing a particular portion of the storage over a second path different from the first path over which I/O operations were initiated for that particular portion of the storage.

In another embodiment, the cache server may receive from a host an instruction to initiate a shadow copy of a source cache. In response, the cache server may transmit a cache map of the source cache to a target cache client identified by the requesting host. In this manner, population of the target cache may be initiated using a cache map from the cache server prior to detection of an actual migration of a virtual server.

As explained in greater detail below, it is believed that such cooperative cache management may facilitate cache warming of a target cache in connection with virtual machine migration, in a manner which can reduce or eliminate modification of existing virtual machine migration infrastructure. Other features and advantages may be realized in addition or instead of those described herein, depending upon the particular application.

As used herein, the term "storage location" refers to a storage location containing one or more units of data storage such as one or more volumes, cylinders, tracks, extents, segments or any portion thereof, or other unit or units of data suitable for transfer.

In the illustrated embodiment, a networked system 2 includes a storage system 4 (also known as a storage control unit or storage controller), and data storage 6. The storage system 4 may be configured as a primary storage system to manage the copying of updates from the primary storage system to a secondary storage system typically at a site remote from the primary storage system. It is appreciated that the storage system and storage may be reconfigured to change the associated primary and secondary roles within a copy relationship.

The networked system 2 may comprise a Storage Area Network (SAN), Local Area Network (LAN), Intranet, the Internet, Wide Area Network (WAN), peer-to-peer network, wireless network, arbitrated loop network, etc. The storage 6 may comprise an array of storage devices, such as a Just a Bunch of Disks (JBOD), Direct Access Storage Device (DASD), Redundant Array of Independent Disks (RAID) array, virtualization device, tape storage, flash memory, etc. It is appreciated that other networked systems and storage may be utilized, depending upon the particular application.

The networked system 2 further includes one or more hosts 14 reading data from and writing updates to the storage 6. In this manner, the storage 6 is shared storage which is shared by each of the hosts 14. The components 4, 6, and 14 are connected to the networked system 2 which enables communication among these components. The networked system 2 may include one or more switches to provide one or more paths of communication between the different networked system 2 elements.

The primary storage system 4 is located at a first site and a secondary storage system may be located at a second site which may be geographically or functionally remote from the first site. Thus, in this example, the first site may be at a local site and the second site may be at a geographically remote site separated by a short or long geographical distance from the local site. Alternatively, the local and remote sites may be relatively close such as in different buildings in the same general geographical location, in different rooms of the same building, in different machines in the same room, or in different portions or partitions of the same machine, of the networked system 2.

A typical host 14 may be thought of as an application server which includes an operating system 18 and an application 20 that reads data from and writes updates to the storage 6 via the storage system 4. The storage system 4 in turn includes storage management software 22 to manage input/output operations accessing the storage 6 and to manage the data mirroring operations between the primary storage system and the secondary storage system. In one embodiment, the networked system 2 employs a cooperative caching system which includes a cache server deployed in the storage system 4, which cooperates with a cache client 34 of each host 14, in the management of the cache 38 of each host. A coordinated caching system of the illustrated embodiment provides for coordinated population of local caches with a central cache in a SAN environment. One example of such a cooperative caching system is described in copending application entitled "Managing Cache Memories", Ser. No. 13/920,669, filed Jun. 18, 2013, and assigned to the assignee of the present application. As described in greater detail therein, the cache server 30 of the storage system 4 keeps track of the cache contents for each cache 38 to provide consistent views to multiple clients.

In the illustrated embodiment, the operating system 18 of each host 14 includes a cache client 34 for managing operations of the associated cache 38 of the particular host 14. It is appreciated that in other embodiments, such cache client operations may be implemented in software such within an application 20, in firmware or within logic circuitry hardware or a combination thereof, depending upon the particular application.

Each host 14 may have one or more central processing units (CPUs) in which the processing as well as the memory and other resources of the application server of the host 14 may be apportioned into physical or logical partitions (often referred to as a "virtual server" or "virtual machine"), each of which is capable of running an individual copy of an operating system and performing the service functions of a "server". Hence, each virtual machine is capable of independently performing data processing functions assigned to that processing node. In this example, the primary function of a virtual machine of a host 14 is to provide a data processing functions such as, for example, data storage, data backup, data retrieval, data deduplication, data mining, data capture, data archiving, data replication, bandwidth reduced data replication, encryption of data, etc. Other data processing functions may be provided, depending upon the particular application.

Thus, as used herein, the term "server" may be used to refer to a physical server, a logical partition, virtual server or virtual machine performing a server function. Each logical partition separately executes one or more applications, an operating system and device drivers. The logical partitions comprise a division of the processors into logically independent but cooperating processing systems each having their own operating systems and device drivers. Multiple logical partitions may execute in each host 14, managed by a supervisor module for that host 14.

In a similar manner, the storage system 4 may include one or more servers, such as storage servers, each of which may be a logical partition, virtual storage server, virtual storage machine, or a physical storage server. Each storage server is capable of running an individual copy of an operating system and device drivers, and performing the storage control functions of a storage "server".

Each device driver provides an interface between the operating system in the logical partition in which the device driver executes, and a device, such as an I/O adapter including host adapters and device adapters. The host adapters enable the storage system 4 to communicate with the hosts 14. The device adapters enable the storage system 4 to communicate with the storage 6.

Figure 2:
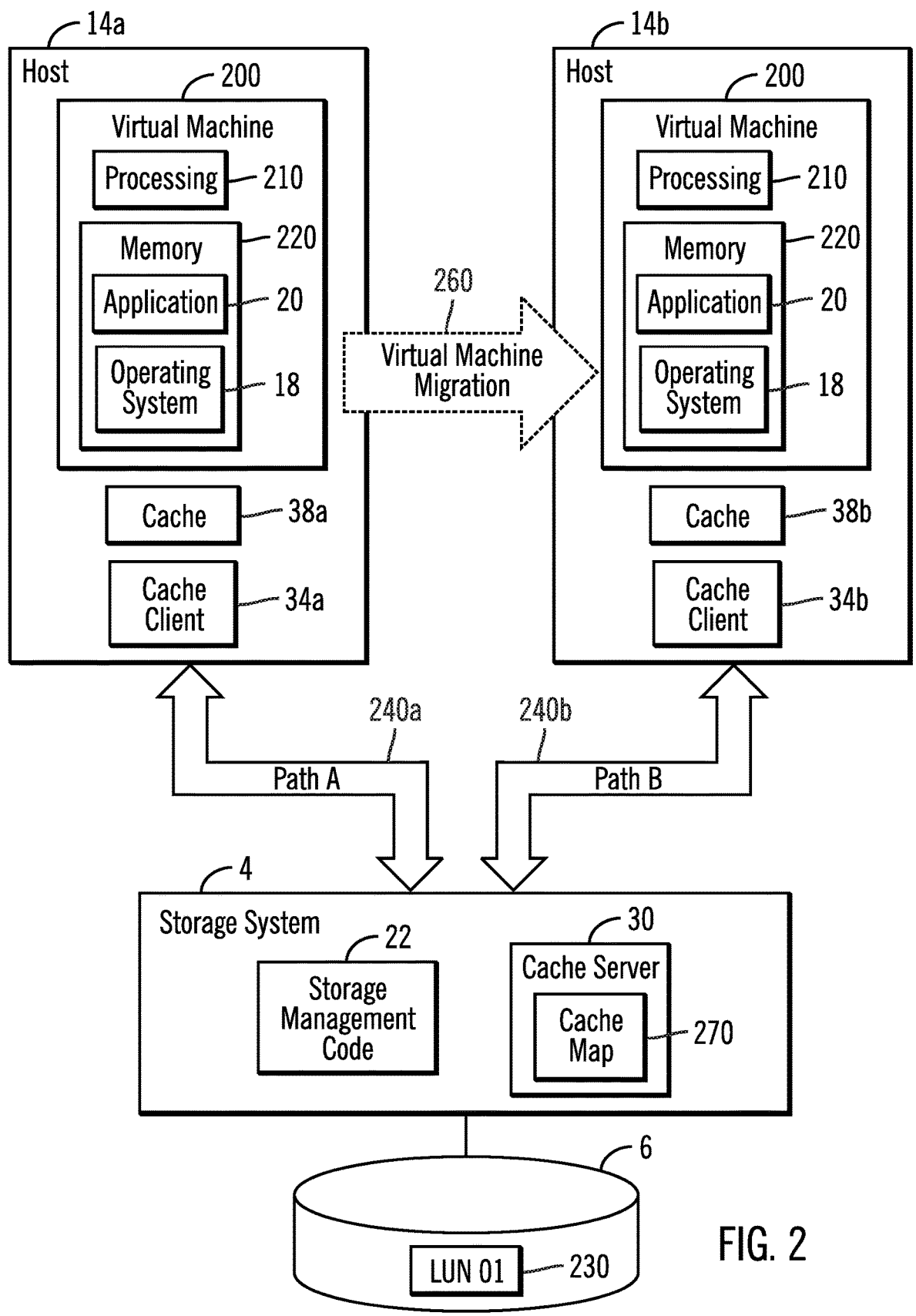
FIG. 2 illustrates an example of a virtual machine migration in a computing environment which may employ cache migration management in accordance with an aspect of the present description.

The storage system 4 communicates with the host adapters and the device adapters over a fabric which may comprise one or more interfaces providing communication paths between the storage system 4 and adapters of the hosts 14 and the storage 6. A communication path comprises the physical hardware in the fabric that enables communication with adapters over the fabric. Each host adapter and each device adapter may have one or more channels, each providing a communication path. The fabric may include one or more switches for interconnecting the various paths between the hosts 14, storage system 4 and storage 6. s FIG. 2 shows one example of a host 14a having one or more logical partitions or virtual machines, one of which is depicted as virtual machine 200. In this example, each virtual machine 200 is an application server which includes a processing resource module 210, and a memory resource module 220. As previously mentioned, a host such as host 14a may have multiple server partitions or virtual machines, each partition having a physical or virtual processing resource module 210 and memory resource module 220 as depicted in FIG. 2.

The memory resource module 220 stores software instructions and data. The processing resource module 210 executes the software instructions and manipulates the data in various operations depending upon the particular application. In the illustrated embodiment, the virtual machine 200 of the host 14a performs input/output (I/O) operations which access a portion 230 of the storage 6 via the storage system 4. In the illustrated embodiment, the storage portion 230 is a particular logical storage unit designated LUN 01. However, it is appreciated that a virtual machine of a host may access other types of storage subdivisions, depending upon the particular application.

The virtual machine 200 of the host 14a communicates with the storage system 4 over a communication path 240a which has been uniquely identified as "Path A" in this example. The communication path 240a includes one or more channels of one or more host adapters, cables, switches, ports and other communication devices, each of which may be physical or virtual. The storage system 4 is capable of identifying which communication path was used by a virtual machine of a host 14 in accessing the storage portion LUN 01. Thus, if a different communication path, such as communication path 240b designated "Path B" is used instead of Path A to communicate I/O operations accessing storage portion LUN 01, the storage system 4 detects the change in communication paths.

The communication paths 240a, 240b to the hosts 14a, 14b may be based upon a particular host attachment protocol such as FICON, for example. It is appreciated that other protocol and architectures may be suitable such as, for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

In the illustrated embodiment, communication hardware associated with the communication paths between the hosts and the storage system includes switches, routers, cables, modems, adapters, power supplies, etc. Communication software associated with the communication paths includes instructions and other software controlling communication protocols and the operation of the communication hardware in accordance with the communication protocols, if any.

As previously mentioned, a host may migrate a virtual machine from one host to another host for a variety of reasons, including load balancing, load consolidation and system maintenance. FIG. 2 depicts the virtual machine 200 being migrated in a migration operation 260 from the host 14a to the host 14b by a virtual machine migration infrastructure. Once completed, I/O operations of the virtual machine 200 of host 14a, accessing storage portion LUN 01, will instead be conducted by the virtual machine 200 of the host 14b. In this example, the I/O operations being conducted by the virtual machine 200 of host 14b will be communicated over Path B instead of Path A, to access the storage portion LUN 01.

Figure 3:
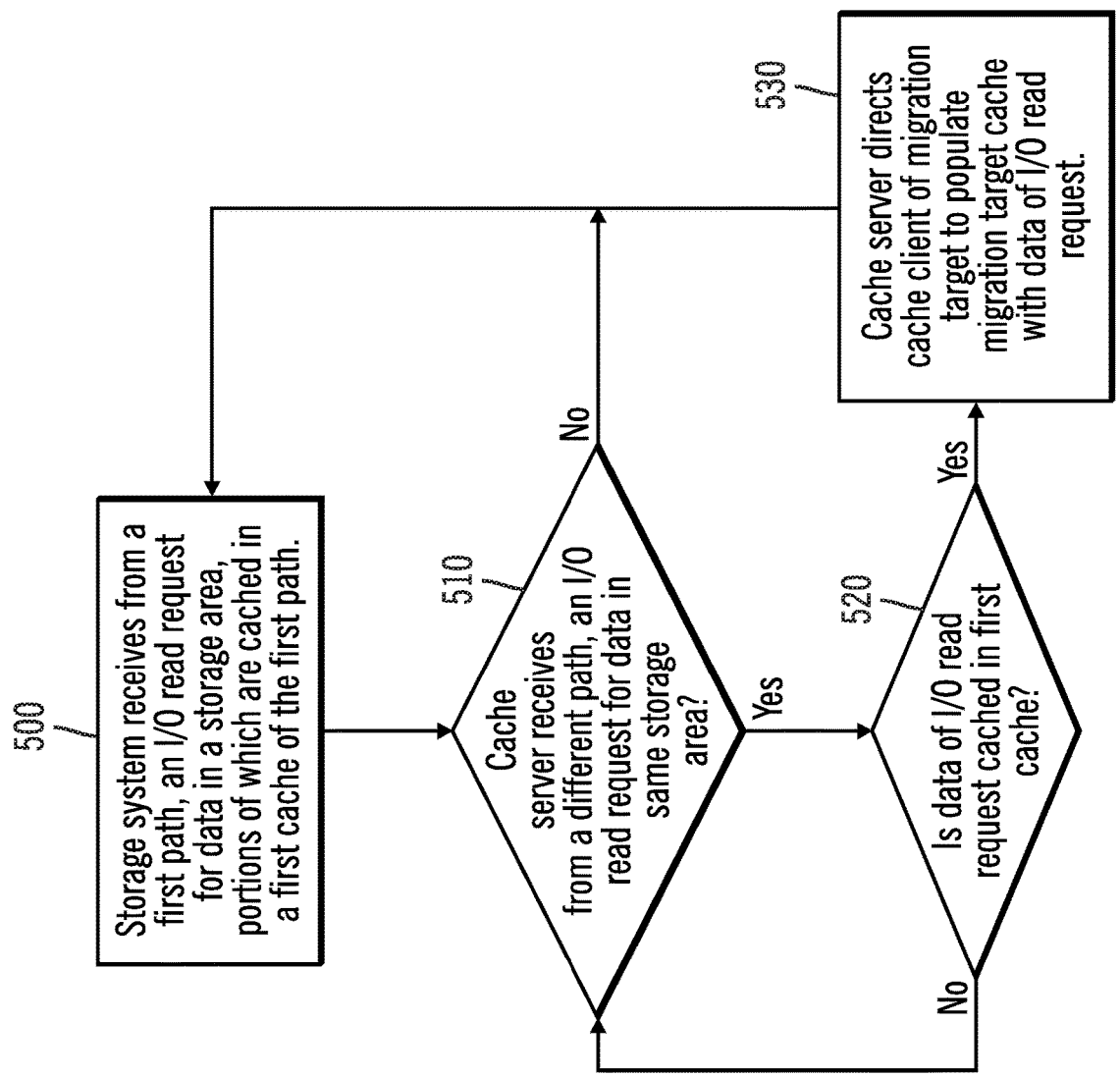
FIG. 3 depicts an example of operations for cache migration management in accordance with an aspect of the present description.

In conducting the I/O operations, the virtual machine 200 migrated to the host 14b will access a cache 38b of the host 14b instead of the cache 38a of the host 14a. FIG. 3 depicts one example of cache management operations which can expedite warming the cache 38b in connection with the migration operation 260. In one operation, a storage system having a cache server such as the cache server 30 (FIG. 2) of the storage system 4, detects (block 300) an operation related to a migration such as the migration 260 of FIG. 2. Thus, for example, when the storage system 4 detects that I/O operations accessing the storage portion LUN 01 are being communicated over Path B instead of Path A, the storage system may interpret the change in communication paths as an indication that a migration operation such as the virtual machine migration 260 has taken place. For example, storage portion LUN 01 may be designated for exclusive use by one virtual machine of a host at a time (often referred to as "shared nothing" storage). Hence, if the path over which I/O operations accessing storage portion LUN 01 changes, the storage system 4 will be alerted that the virtual machine accessing the storage portion LUN 01 may have moved due to a virtual machine migration.

In one embodiment, a storage system such as the storage system 4 need not have access to detailed information concerning the migration, such as the identity of the source host or the target host, or when the virtual machine migration has been or will be started or finished. Instead, in accordance with one aspect of the present description, the storage server may have minimal or no notification from the virtual machine infrastructure or virtual machine migration infrastructure that a virtual machine migration has taken place. Instead, the storage server may detect an operation by a host which is related to a virtual machine migration, such as detecting that an I/O operation accessing a particular storage portion has changed path. As a consequence, it is believed that accelerated cache warming of a target cache may be achieved with little or no modification of virtual machine migration infrastructure which typically maintains detailed information concerning the virtual machine migration.

The change in path of I/O operations from Path A to Path B make take the form of a change in host adapter or a change in a channel within the host adapter coupled to the storage system 4, for example, over which I/O operations accessing the storage portion LUN 01 are being communicated from a host to the storage system 4. It is appreciated that a change in path may manifest itself in other hardware or software changes, depending upon the particular application.

It is further appreciated that the storage system may detect other types of operations related to a virtual machine migration. For example, as explained in greater detail below, the storage system 4 may receive a migration related instruction such as a command to initiate a shadow copy of a cache of a host. Such a command may be issued by a host in anticipation of a migration operation which has not yet taken place.

In response to detection (block 300) by the storage system of an operation related to a virtual machine migration, the cache server of the storage system forwards (block 310) a cache map to a cache client of a host such as a target host of a virtual machine migration. Thus, in the example of FIG. 2, the cache server 30 may forward a cache map 270 identifying storage locations of the storage portion LUN 01 which have been cached in cache 38a of the host 14a. The cache server 30 may request the cache map from the cache client 34a of the host 14a in response to the detection of the an operation related to a virtual machine migration, or may have already received the cache map in connection with other cache management operations.

In another aspect of the present description, in one embodiment, the cache server 30 need not be notified by the virtual machine migration infrastructure as to the identity of the migrated virtual server or as to the completion of the virtual machine migration. Instead, by detecting that I/O operations accessing storage location LUN 01 which were previously transmitted over a Path A, have now switched to a Path B, the storage system 4 can deduce that a virtual machine of a host transmitting the I/O operations over Path B and accessing the storage portion LUN 01 is the target server of a virtual machine migration. Accordingly, the cache server 30 can transmit a cache map to the cache client 34b which it has previously associated with Path B in the cooperative cache structure, to initiate warming of the cache 38b of the Path B. Moreover, the cache server 30 need not be notified by the virtual machine migration infrastructure as to the identity of the source virtual machine of the virtual machine migration or the identity of the cache of the source server. Instead, the source server 30 identifies the cache of the source cache as cache 38a of the Path A. Hence, the cache server can deduce that the appropriate cache map to forward to the cache client 34b to initiate warming of the cache 38b is the cache map of the cache 38a of the Path A since the I/O operations accessing the storage portion LUN 01 over Path B were, prior to the migration, being transmitted over the Path A.

The cache map forwarded to the cache client 34b of the host 14b by the cache server 30 of the storage system 4, may be a list identifying all storage locations of the storage portion LUN 01 cached in the cache 38a on behalf of the virtual machine 200 of the host 14a. However, it is appreciated that in some applications, it may be appropriate to forward a cache map listing only a portion of the all storage locations of the storage portion LUN 01 cached in the cache 38a of the host 14a.

Upon receipt of the cache map, the recipient cache client of the migration target populates (block 320) the cache of the migration target with data read from the storage locations identified by the cache map. Thus, for example, the cache map forwarded to the cache client 34*b* of the host 14*b* by the cache server 30 of the storage system 4, may be used to identify the storage locations of the storage portion LUN 01 which have been cached in the cache 38*a* of the host 14*a*, to read the data contained in those identified storage locations and to cache the data in the cache 38*b*. The cache client 34*b* may cache in the cache 38*b* the data of all the storage locations of the storage portion LUN 01 identified in the cache map in accordance with a "must have" protocol, for example. However, it is appreciated that in some applications, it may be appropriate for the cache client 34*b* to cache in the cache 38*b* a subset of the data of all the storage locations of the storage portion LUN 01 identified in the cache map. In this manner, the cache 38*b* may be expeditiously warmed to a state the same as or similar to that as the cache 38*a* for storage locations in storage portion LUN 01 in support of the I/O operations migrated to the virtual machine 200 of the host 14*b*.

As previously mentioned, the virtual machine migration infrastructure typically maintains the virtual machine migration related information such as the identity of the source and target hosts, and when a virtual machine migration starts and finishes, for example. Conversely, cache management software operating on a host typically maintains information on the contents of the host cache. In accordance with the present description, it is appreciated that due to the large number of different types of virtual machine migration infrastructures marketed by different entities, modifying each different virtual machine migration infrastructure to expedite cache warming in connection with a virtual machine migration may encounter difficulties.

In contrast, it is believed that cooperative cache management in accordance with one aspect of the present description, in which the storage system detects an operation related to a virtual machine migration, and initiates warming a cache at a target host, can facilitate such cache warming in connection with an impending, on-going, or completed virtual machine migration with little or no input from the existing virtual machine migration infrastructure. Hence, cache warming in connection with an impending, on-going, or completed virtual machine migration may be achieved with reduced or no modification of the virtual machine migration infrastructure.

Figure 4:
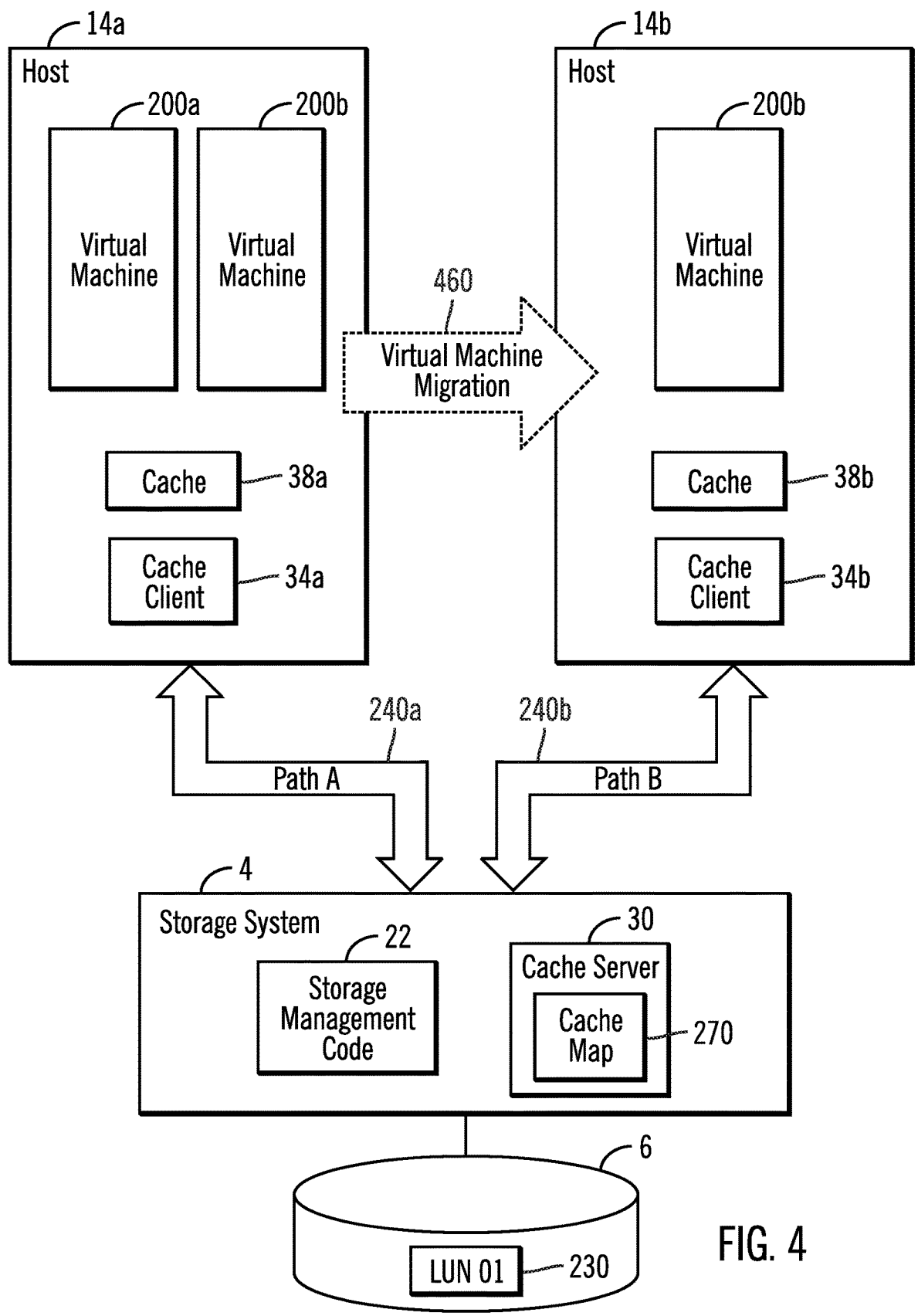
FIG. 4 illustrates another example of a virtual machine migration in a computing environment which may employ cache migration management in accordance with an aspect of the present description.

In the example described above, the storage portion LUN 01 may be designated for exclusive use by one virtual machine of a host at a time. FIG. 4 is directed to an embodiment in which two more virtual application servers, such as the virtual machines 200*a* and 200*b*, for example, of the host 14*a*, share access to the storage portion 230 designated LUN 01. In this example, the cache client 34*a* of the host 14*a* manages the cache 38*a* which is shared by both virtual machines 200*a* and 200*b* of the host 14*a*, and contains data cached from locations of the storage portion LUN 01 of the storage 6 on behalf of both the virtual machines 200*a*, 200*b*. In addition, the cache client 34*a* maintains a cache map identifying the locations of the storage portion LUN 01 of the storage 6 which have been cached in the cache 38*a*. However, it is appreciated that in some applications, the cache map may not distinguish between cache entries relating to the I/O operations of the virtual machine 200*a*, and the cache entries relating to the I/O operations of the virtual machine 200*b*, both being hosted by the host 14*a*

FIG. 4 depicts the virtual machine 200*b* being migrated in a migration operation 460 from the host 14*a* to the host 14*b* by a virtual machine migration infrastructure. Once completed, I/O operations of the virtual machine 200*b* of host 14*a*, accessing storage portion LUN 01, will instead be conducted by the virtual machine 200*b* of the host 14*b*. In this example, the I/O operations being conducted by the virtual machine 200*b* of host 14*b* will be communicated over Path B instead of Path A, to access the storage portion LUN 01. The I/O operations being conducted by the virtual machine 200*a* of host 14*a* will be continue to be communicated over Path A, to access the storage portion LUN 01. In conducting the I/O operations, the virtual machine 200*b* migrated to the host 14*b* will access a cache 38*b* of the host 14*b* instead of the cache 38*a* of the host 14*a*.

FIG. 5 depicts one example of cache management operations which can expedite warming the cache 38*b* in connection with the migration operation 460. In one operation, a storage system such as the storage system 4, for example, receives (block 500) from a first path, such as the Path A, for example, an I/O read request for data in a storage area such as LUN 01, for example, portions of which are cached in a first cache of the first path, such as cache 38*a* of Path A, for example. A cache server such as the cache server 30 (FIG. 4) of the storage system 4, may detect an operation related to a migration such as the migration 460 of FIG. 4. More specifically, in one example, the storage system 4 detects (block 510) whether I/O operations accessing the same storage portion LUN 01 are being communicated over Path B in addition to Path A whereas such operations were previously communicated exclusively over Path A, for example. The storage system may interpret the change in communication path usage as an indication that a migration operation such as the virtual machine migration 460 has taken place. For example, storage portion LUN 01 may experience exclusive use by the virtual machines of a particular host such as host 14*a*, over a single path such as Path A. Hence, if the path over which I/O operations accessing storage portion LUN 01 changes, the storage system 4 will be alerted that a virtual machine accessing the storage portion LUN 01 may have changed to a different host such as host 14*b*, for example, due a virtual machine migration.

In this example also, a storage system such as the storage system 4 need not have access to detailed information concerning the migration, such as the identity of the source host or the target host, or when the virtual machine migration has been or will be started or finished. Instead, in accordance with one aspect of the present description, the storage server may have minimal notification such as detecting an operation by a host which is related to a virtual machine migration. As a consequence, modification of existing virtual machine migration infrastructure which typically maintains detailed information concerning the virtual machine migration, may be reduced or eliminated.

Here too, the change in path of I/O operations from Path A to both Path A and Path B make take the form of a switch from one host adapter or channel within the host adapter coupled to the storage system 4, for example, to a different host adapter or adapter channel, over which I/O operations accessing the storage portion LUN 01 are being communicated from a host to the storage system 4. It is appreciated that a change in path may manifest itself in other hardware use or software use changes, depending upon the particular application.

As previously mentioned, in some embodiments in which a cache is being shared by more than one virtual machine accessing a particular storage portion such as storage portion LUN 01, information as to which cache entries are on behalf of which virtual machine may not be readily available.

Accordingly, in the embodiment of FIG. 5, in response to detection (block 510) by the storage system of a switch in path from Path A to Path B, a determination (block 520) is made as to whether the data being accessed by the I/O read request directed over Path B for the storage portion LUN 01 has already been cached in the first cache 38*a* of the host 14*a*. If so, the cache server of the storage system directs (block 530) the cache client 38*b* of the host 14*b* to populate the migration target cache such as cache 38*b* of the host 14*b* with the data of the I/O read request received over Path B.

In this embodiment, a cache miss of the cache 38*b* results in the cache server 30 directing the cache client 34*b* to populate the cache 38*b* with the data of the cache miss if that data has already been cached in the cache 38*a* previously used by the source virtual machine 200*b* of the host 14*a* prior to the virtual machine migration. Conversely, a cache miss of the cache 38*b* does not, in this embodiment, result in the cache server 30 directing the cache client 34*b* to populate the cache 38*b* with the data of the cache miss if that data has not already been cached in the cache 38*a* previously used by the source virtual machine 200*b* of the host 14*a* prior to the virtual machine migration. In this manner, warming of the cache 38*b* may be facilitated on an "on demand" basis.

To direct (block 530) the cache client 34*b* to populate the cache 38*b*, the cache server 30 forwards a cache map to a cache client of a host such as a target host of a virtual machine migration. Thus, in the example of FIG. 4, the cache server 30 may forward a cache map 270 identifying storage locations of the storage portion LUN 01 which are both the subject of an I/O read request received over Path B and directed to storage portion LUN 01, and have been cached in cache 38*a* of the host 14*a*. The cache server 30 may request the cache map from the cache client 34*a* of the host 14*a* in response to the detection of the an operation related to a virtual machine migration, or may have already received the cache map in connection with other cache management operations.

The cache map forwarded to the cache client 34*b* of the host 14*b* by the cache server 30 of the storage system 4, may be a list identifying all storage locations of the storage portion LUN 01 which are both the subject of an I/O read request received over Path B and directed to storage portion LUN 01, and have been cached in cache 38*a* of the host 14*a*. However, it is appreciated that in some applications, it may be appropriate to forward a cache map listing only a portion of the all storage locations of the storage portion LUN 01 which are both the subject of an I/O read request received over Path B and directed to storage portion LUN 01, and have been cached in cache 38*a* of the host 14*a*.

Upon receipt of the cache map, the recipient cache client of the migration target populates (block 530) the cache of the migration target with data read from the storage locations identified by the cache map. Thus, for example, the cache map forwarded to the cache client 34*b* of the host 14*b* by the cache server 30 of the storage system 4, may be used to identify the storage locations of the storage portion LUN 01 which are to be cached in the cache 38*b* of the host 14*b*, to read the data contained in those identified storage locations and cache the data in the cache 38*b*. The cache client 34*b* may cache in the cache 38*b* all the storage locations of the storage portion LUN 01 identified in the cache map. However, it is appreciated that in some applications, it may be appropriate for the cache client 34*b* to cache in the cache 38*b* a subset of all the storage locations of the storage portion LUN 01 identified in the cache map. In this manner, the cache 38*b* may be expeditiously warmed to a state the same as or similar to that as the cache 38*a* for storage locations in storage portion LUN 01 in support of the I/O operations migrated to the virtual machine 200*b* of the host 14*b*.

Figure 6:
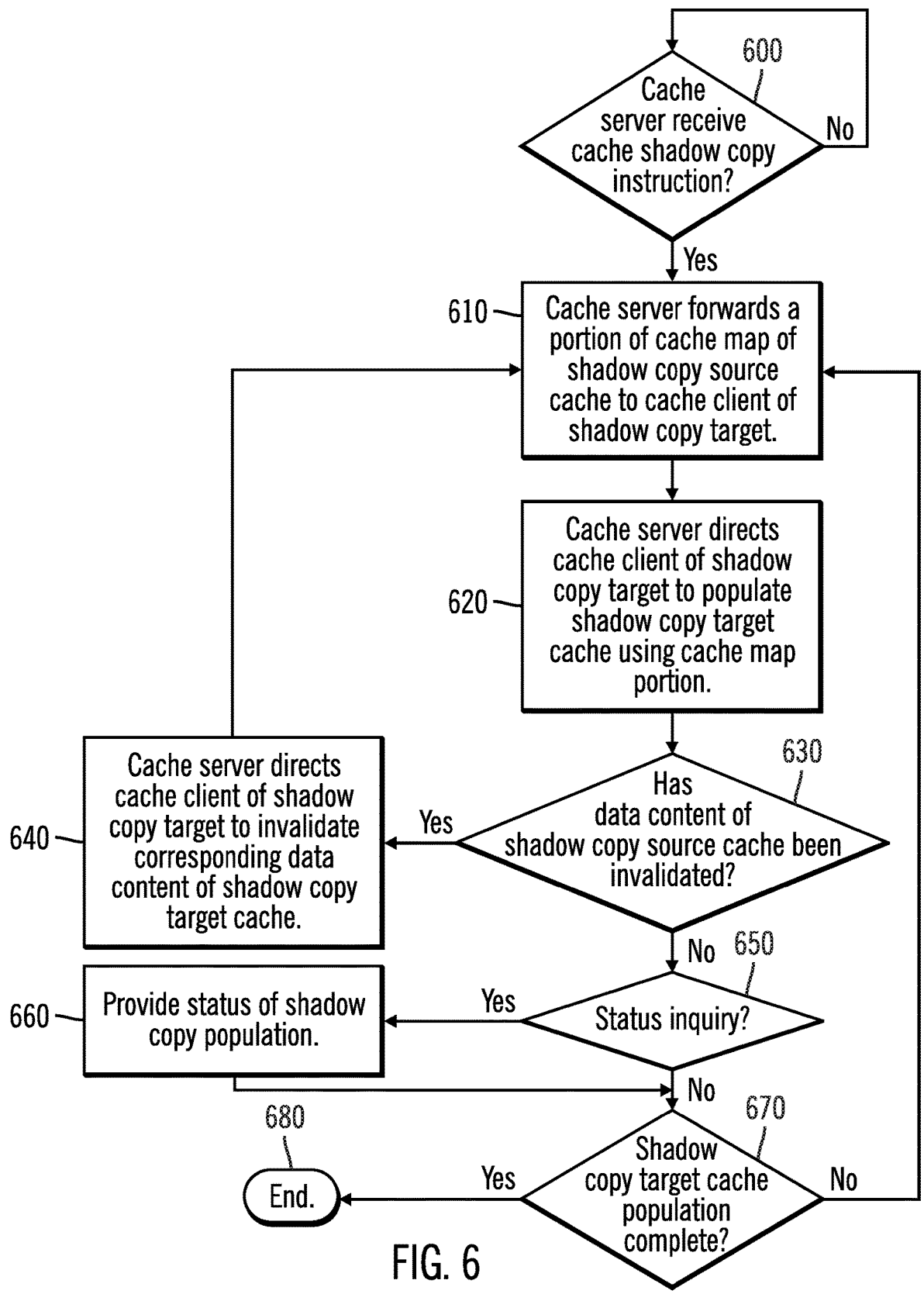
FIG. 6 illustrates another example of operations for cache migration management in accordance with another aspect of the present description.

In some embodiments discussed above, a virtual machine migration may have been completed or at least initiated. FIG. 6 depicts one example of cache management operations which can expedite warming the cache 38*b* in anticipation of a virtual machine migration operation such as the virtual machine migrations 260 (FIG. 2), for example. In one operation, a storage system such as the storage system 4, for example, receives (block 600) a cache shadow instruction, instructing the cache server 30 of the storage system 4 to make a shadow copy of a cache of one of the hosts such as the cache 38*a* of the host 14*a*, for example. Such a cache shadow instruction may be transmitted by a host or application server of the host or virtual machine migration infrastructure of the host, for example. Furthermore, the cache shadow instruction may be transmitted before a virtual machine migration begins, during or upon completion of a virtual machine migration.

In this example, read operations are conducted over a first path, such as the Path A, for example, accessing data in a storage area such as LUN 01, for example, portions of which are cached in a first cache of the first path, such as cache 38*a* of Path A, for example. In the illustrated embodiment, the cache shadow instruction identifies the path, such as Path A, for example of the source cache such as the cache 38*a*, for example, and also identifies the path, such as the Path B, of the target cache such as the cache 38*b*, for example. In addition, the cache shadow instruction identifies a range of cache entries to be copied. Thus, the cache shadow copy may identify the range of cache locations of cache 38*a* to be those cache locations containing data cached from storage portion LUN 01, for example.

In response, the cache server of the storage system forwards (block 610) a cache map to a cache client of a host of the identified path and directs the target cache client to populate (block 620) the shadow copy target cache using the cache map provided by the cache server. Thus, in the example of FIG. 2, the cache server 30 may forward a cache map 270 identifying a subset, for example, of the storage locations of the storage portion LUN 01 which have been cached in cache 38*a* of the host 14*a*. The cache server 30 may request the cache map from the cache client 34*a* of the host 14*a* in response to the receipt of the cache shadow copy instruction, or may have already received the cache map in connection with other cache management operations. The cache server 30 may request a cache map of one or more subsets of cache entries of the cache 38*a* on a periodic basis or in response to events, or may request the entire cache map of cache entries of the cache 38*a* at one time.

In another aspect of the present description, it is appreciated that a cache entry cached in the cache 38*a* may be invalidated by I/O operations such as a write of new data to the location in the storage portion LUN 01 previously cached in the cache 38*a*. Thus, due to the write operation, the data in the cache 38*a* corresponding to that location of the storage portion LUN 01 is no longer valid and is invalidated. Accordingly, in one embodiment, a check (block 630) is made as to whether the data content of the shadow copy source cache has been invalidated. If so, the cache server directs (block 640) the cache client of the shadow copy target cache to invalidate the data content of the corresponding cache entry of the shadow copy target cache. In this manner, cache entry invalidations of the shadow copy source cache may be synchronized in the shadow copy target cache.

In another aspect of the present description, it is appreciated that a host may monitor the progress of the on-going shadow copying of cache entries from the shadow copy source cache to the shadow copy target cache. For example, the cache server may receive (block 650) a status inquiry from a host, inquiring as to status of the shadow copy operation. In response, the cache server may inform (block 660) the inquiring host as to whether the shadow copy operation has been completed or if not, the degree of completion. In one aspect, a host may initiate a virtual machine migration, using a virtual machine migration infrastructure, as a function of the degree of completion of the shadow copy operation. Thus, a host may initiate a virtual machine migration once the shadow copy operation has been completed or at least partially completed to a satisfactory minimum level. In this manner, a shadow copy target cache such as the cache 38b may be expeditiously warmed to a state the same as or similar to that as the shadow copy source cache, such as cache 38a, for storage locations in storage portion LUN 01 in support of the I/O operations which will be migrated to the virtual machine such as the virtual machine 200b of the host 14b. Once the shadow copy target cache population is complete (block 670), this portion of the cache management may end (block 680).

Thus, the communication paths to the hosts 14 may be based upon a particular host attachment protocol such as FICON, for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

In the illustrated embodiment, communication hardware associated with the communication paths between the nodes includes switches, routers, cables, modems, adapters, power supplies, etc. Communication software associated with the communication paths includes instructions and other software controlling communication protocols and the operation of the communication hardware in accordance with the communication protocols, if any. It is appreciated that other communication path protocols may be utilized, depending upon the particular application.

Figure 7:
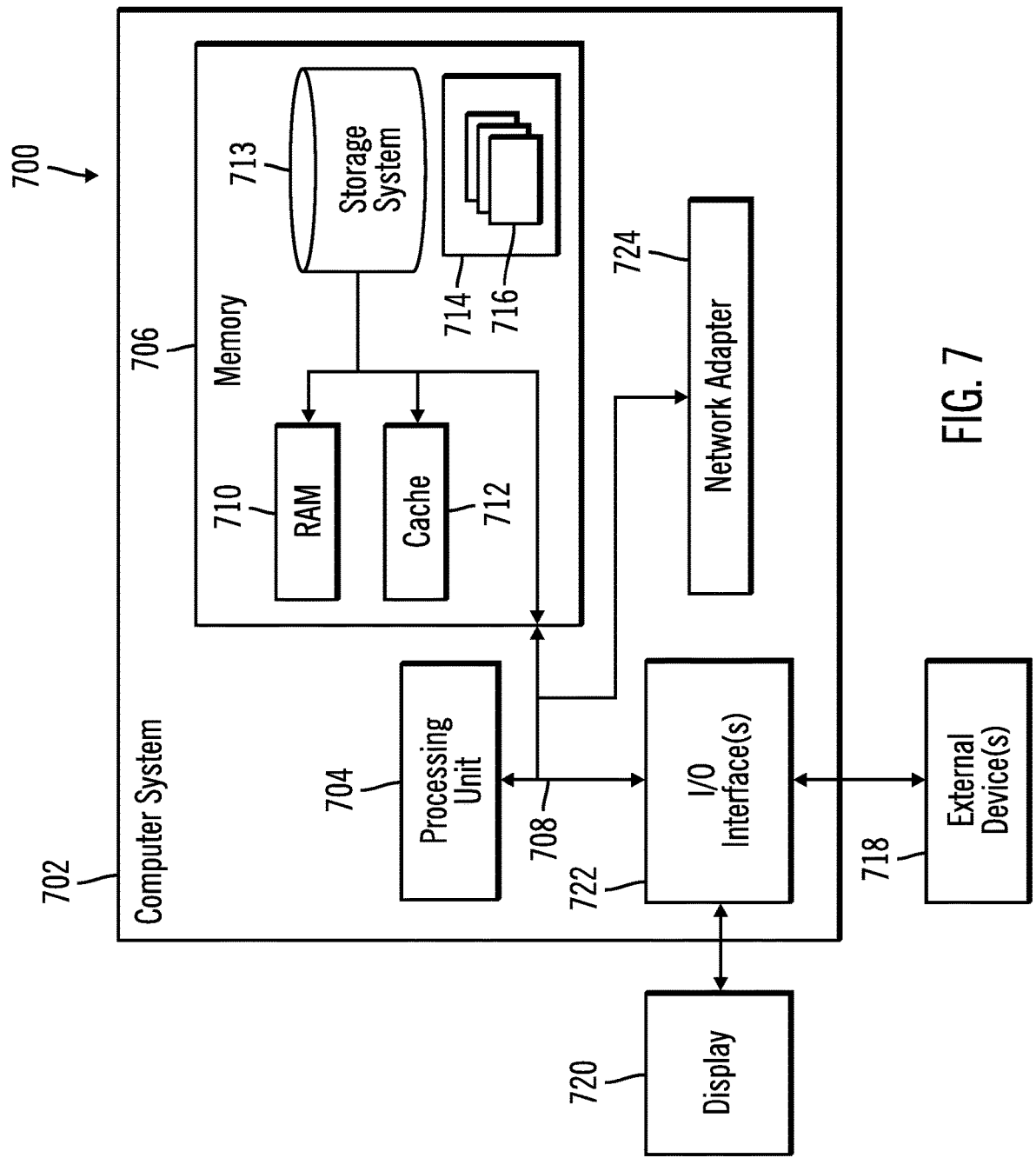
FIG. 7 illustrates an example of a node of a distributed computing system having cache migration management in accordance with one aspect of the present description.

FIG. 7 illustrates one embodiment of a node 700 of a distributed computing system such a host, application server, storage controller, server or virtual server the storage area network 2 of FIG. 2. However, it is appreciated that the node of FIG. 7 may comprise any suitable computing device 702, such as a mainframe, server, personal computer, laptop, handheld computer, telephony device, network appliance, virtualization device, storage controller, failover lock device, embedded device, etc.

It is appreciated that the nodes of a distributed computing system may perform a variety of data processing functions such as data storage and management in disk arrays, for example. Thus, the node of FIG. 7 may perform data processing tasks such as data backup, data deduplication, data mining data capture, data archiving, data replication, bandwidth reduced data replication, encryption of data, etc. and typically involve the transfer of large amounts of data between the hosts 14 and storage 6 (FIG. 2). The node 700 may perform cache migration management in accordance with one or more embodiments described herein.

The node may include a processor 704 (e.g., a microprocessor), a memory 706 (e.g., a volatile memory device 710), cache 712, and storage 713 (e.g., a non-volatile storage, such as magnetic disk drives, optical disk drives, a tape drive, flash storage etc.). The storage 714 may comprise an internal storage device or an attached or network accessible storage. Programs 716 in the storage 714 are loaded into the memory 710 and executed by the processor 704 as represented by an operating system and data processing programs 716. Programs 716 are also provided in the memory 704 for cache management in accordance with the present description.

The node further includes a network controller or adapter 724 to enable communication with a network such as an Ethernet, a Fibre Channel Arbitrated Loop, etc. which interconnects the nodes of the distributed computing system. The network controller or adapter 724 may also enable communication with a network path to a host 14 or communication with a network path to storage 6.

User input devices 718 provide user input to the processor 704, and may include a keyboard, mouse, pen-stylus, microphone, touch sensitive display screen, or any other suitable activation or input mechanism. Output devices 720 are capable of rendering information transmitted from the processor 704, or other component, such as a display monitor, printer, storage, etc. The input devices 718, and output devices 720 may be coupled directly to a node using a suitable KVM (keyboard, video, mouse) switch in some applications.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, an application specific integrated circuit (ASIC), a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present description may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present description are described above with reference to flowchart illustrations and/or block diagrams of methods, apparatus (systems) and computer program products according to embodiments of the description. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present description(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present description.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present description need not include the device itself The illustrated operations of FIGS. 3, 5 and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the description has been presented for the purposes of illustration and description. It is not intended to be exhaustive or to limit the description to the precise form disclosed. Many modifications and variations are possible in light of the above teaching. It is intended that the scope of the description be limited not by this detailed description, but rather by the claims appended hereto. The above specification, examples and data provide a complete description of the manufacture and use of the composition of the description. Since many embodiments of the description may be made without departing from the spirit and scope of the description, the invention resides in the claims herein after appended.

What is claimed is:

1. A method, comprising:
    detecting by a storage controller controlling a storage, an operation by a host relating to migration of input/output (I/O) operations including I/O requests transmitted from a source host having a source cache and a source cache client wherein the source cache client is adapted to populate the source cache with data entries of data read from locations within a portion of the storage accessed by the I/O requests; and
    transmitting by a cache server of the storage controller, to a target cache client of a target host, a cache map of the source cache of the source host wherein the cache map identifies locations of the portion of the storage cached in the source cache for populating by the cache client of the target host, the target cache of the target host with data from the locations of the portion of the storage, as identified by the cache map transmitted by the cache server.

2. The method of claim 1 wherein the detecting of the migration related operation includes said cache server detecting the migration of I/O operations in a virtual machine from said source host to said target host, wherein said transmitting the cache map is in response to said detecting.

3. The method of claim 2 further comprising initially receiving by the storage controller the I/O requests transmitted over a first path from the source host and wherein the detecting migration of I/O operations includes said storage controller detecting reception of I/O requests accessing said portion of the storage over a second path different from the first path.

4. The method of claim 1 wherein the detecting of the migration related operation includes the cache server receiving from a host an instruction to initiate a shadow copy of the source cache, wherein said transmitting the cache map to the target cache client is in response to said instruction reception.

5. The method of claim 4 further comprising the cache server determining what portion of the shadow copy of the source cache at the target cache has been completed.

6. The method of claim 1 further comprising, in response to the source cache client invalidating a data entry in the source cache in response to a write I/O request to a data location of the portion of the storage addressed by the write I/O request, the cache server instructing the target cache client of the target host to invalidate a corresponding data entry of the target cache corresponding to the data location of the portion of the storage addressed by the write I/O request.

7. The method of claim 1 further comprising initially receiving by the storage controller the I/O requests over a first path from the source host and wherein the detecting migration of I/O operations includes said storage controller detecting reception of a read I/O request accessing said portion of the storage over a second path different from the first path, and said cache server instructing said target cache client to populate said target cache with data read from the data location of the portion of the storage addressed by the read I/O request.

8. A system for use with a storage and plurality of hosts, each host having a cache and a cache client adapted to manage populating the cache of the host, comprising:
    a storage controller adapted to access and control said storage in response to input/output requests from a source host of said plurality of hosts, said storage controller having a cache server adapted to cooperate with a source cache client of each source host to manage the populating of a source cache of the associated source host;
    a plurality of paths coupling the hosts to the storage controller; and
    at least one non-transitory computer readable storage medium having computer readable program code embodied therein that is enabled to cause operations to be performed, the operations comprising:
    detecting by the storage controller, an operation by a host relating to migration of I/O operations from a source host; and
    transmitting by the cache server of the storage controller, to a target cache client of a target host, a cache map of the source cache of the source host wherein the cache map identifies locations of the portion of the storage cached in the source cache for populating by the cache client of the target host, the target cache of the target host with data from the locations of the portion of the storage, as identified by the cache map transmitted by the cache server.

9. The system of claim 8 wherein the source host has a virtual machine and the detecting of the migration related operation includes said cache server detecting the migration of I/O operations from the virtual machine of said source host to said target host, wherein said transmitting the cache map is in response to said detecting.

10. The system of claim 9 wherein the plurality of paths include a first path for I/O requests from the source host and wherein the detecting migration of I/O operations includes said storage controller detecting reception of I/O requests accessing said portion of the storage over a second path of said plurality of paths, different from the first path.

11. The system of claim 8 wherein the detecting of the migration related operation includes the cache server receiving from a host an instruction to initiate a shadow copy of the source cache, wherein said transmitting the cache map to the target cache client is in response to said instruction reception.

12. The system of claim 11 wherein the operations of the computer readable program code further comprise the cache server determining what portion of the shadow copy of the source cache at the target cache has been completed.

13. The system of claim 8 wherein the operations of the computer readable program code further comprise in response to the source cache client invalidating a data entry in the source cache in response to a write I/O request to a data location of the portion of the storage addressed by the write I/O request, the cache server instructing the target cache client of the target host to invalidate a corresponding data entry of the target cache corresponding to the data location of the portion of the storage addressed by the write I/O request.

14. The system of claim 8 wherein the plurality of paths include a first path for I/O requests from the source host and wherein the operations of the computer readable program code further comprise said storage controller detecting reception of a read I/O request accessing said portion of the storage over a second path different from the first path, and said cache server instructing said target cache client to populate said target cache with data read from the data location of the portion of the storage addressed by the read I/O request.

15. A computer program product for managing input/output operations in connection with a plurality of hosts, each host having a cache and a cache client adapted to manage populating the cache of the host, storage, a storage controller adapted to access and control said storage in response to input/output requests from a source host of said plurality of hosts, said storage controller having a cache server adapted to cooperate with a source cache client of each source host to manage the populating of a source cache of the associated source host, and a plurality of paths coupling the hosts to the storage controller; the computer program product comprising a non-transitory computer readable storage medium having computer readable program code embodied therein that is enabled to cause operations to be performed, the operations comprising:

detecting by the storage controller, an operation by a host relating to migration of I/O operations from a source host; and transmitting by the cache server of the storage controller, to a target cache client of a target host, a cache map of the source cache of the source host wherein the cache map identifies locations of the portion of the storage cached in the source cache for populating by the cache client of the target host, the target cache of the target host with data from the locations of the portion of the storage, as identified by the cache map transmitted by the cache server.

16. The computer program product of claim 15 wherein the source host has a virtual machine and the detecting of the migration related operation includes said cache server detecting the migration of I/O operations from the virtual machine of said source host to said target host, wherein said transmitting the cache map is in response to said detecting.

17. The computer program product of claim 16 wherein the plurality of paths include a first path for I/O requests from the source host and wherein the detecting migration of I/O operations includes said storage controller detecting reception of I/O requests accessing said portion of the storage over a second path of said plurality of paths, different from the first path.

18. The computer program product of claim 15 wherein the detecting of the migration related operation includes the cache server receiving from a host an instruction to initiate a shadow copy of the source cache, wherein said transmitting the cache map to the target cache client is in response to said instruction reception.

19. The computer program product of claim 18 wherein the operations of the computer readable program code further comprise the cache server determining what portion of the shadow copy of the source cache at the target cache has been completed.

20. The computer program product of claim 15 wherein the operations of the computer readable program code further comprise in response to the source cache client invalidating a data entry in the source cache in response to a write I/O request to a data location of the portion of the storage addressed by the write I/O request, the cache server instructing the target cache client of the target host to invalidate a corresponding data entry of the target cache corresponding to the data location of the portion of the storage addressed by the write I/O request.

21. The computer program product of claim 15 wherein the plurality of paths include a first path for I/O requests from the source host and wherein the operations of the computer readable program code further comprise said storage controller detecting reception of a read I/O request accessing said portion of the storage over a second path different from the first path, and said cache server instructing said target cache client to populate said target cache with data read from the data location of the portion of the storage addressed by the read I/O request.

\* \* \* \* \*